United States Patent
Le Pennec et al.

(10) Patent No.: US 7,983,284 B2
(45) Date of Patent: *Jul. 19, 2011

(54) VIRTUAL PRIVATE NETWORK BASED UPON MULTI-PROTOCOL LABEL SWITCHING ADAPTED TO MEASURE THE TRAFFIC FLOWING BETWEEN SINGLE RATE ZONES

(75) Inventors: Jean-François Le Pennec, Nice (FR); Aurélien Bruno, Nice (FR); Didier F. Giroir, Cagnes sur Mer (FR); Aline Fichou, La Colle sur Loup (FR)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,534

(22) Filed: Dec. 21, 2009

(65) Prior Publication Data

US 2010/0158020 A1    Jun. 24, 2010

Related U.S. Application Data

(63) Continuation of application No. 10/638,518, filed on Aug. 11, 2003, now Pat. No. 7,668,181.

(30) Foreign Application Priority Data

Oct. 22, 2002    (FR) ...................... 02 13135

(51) Int. Cl.
*H04L 12/28*    (2006.01)
(52) U.S. Cl. ........ 370/401; 370/392; 370/411; 370/471; 370/474

(58) Field of Classification Search ............ 370/389, 370/392, 395.31, 396, 400, 401, 404, 411, 370/465, 471, 474; 709/217, 218, 219; 455/403, 455/422.1, 405–408; 379/114.01, 115.01, 379/121.03

See application file for complete search history.

(56) References Cited

U.S. PATENT DOCUMENTS

| | | | |
|---|---|---|---|
| 7,389,358 B1 * | 6/2008 | Matthews et al. | 709/238 |
| 7,430,284 B2 * | 9/2008 | Dudley et al. | 379/88.13 |
| 7,640,319 B1 * | 12/2009 | Sylvain et al. | 709/218 |
| 7,668,087 B2 * | 2/2010 | Hussain et al. | 370/230 |

* cited by examiner

*Primary Examiner* — Pankaj Kumar
*Assistant Examiner* — Mark A Mais

(57) ABSTRACT

Virtual Private Network (VPN) dedicated to a customer using a physical transmission network based upon Multi-Protocol Label Switching (MPLS) technology including a plurality of Provider (P) devices and a plurality of Provider Edge (PE) devices, the customer owning at least two specific Customer Edge (CE) devices amongst a plurality of CE devices, a specific CE device being attached to a specific PE device and enabling the customer to gain access to any other CE device belonging to the same VPN, by the intermediary of PE devices to which are attached the CE devices. The VPN comprises several billing zones (10, 12, 14) being each defined by the application of a single flat rate. A PE device (18) belonging to each billing zone includes a virtual router (58, 60, 62) associated with each billing zone, two virtual routers being interconnected by a virtual circuit (38, 40, 42) transmitting all the traffic exchanged between the two associated billing zones so that the traffic flowing between the two billing zones can be measured and therefore precisely billed to the customer.

14 Claims, 3 Drawing Sheets

VIRTUAL PRIVATE NETWORK BASED UPON MULTI-PROTOCOL LABEL SWITCHING ADAPTED TO MEASURE THE TRAFFIC FLOWING BETWEEN SINGLE RATE ZONES

This application is a continuation of prior application Ser. No. 10/638,518, filed on Aug. 11, 2003, issued as U.S. Pat. No. 7,668,181 on Feb. 23, 2010, and incorporated by reference herein in its entirety, which claims priority under 35 U.S.C. §119(b) to French Application No. 0213135, filed Oct. 22, 2002.

TECHNICAL FIELD

The present invention generally relates to the data transmission systems using an infrastructure which is a physical transmission network wherein Virtual Private Networks (VPN) using part of the devices included in the physical transmission network are dedicated to different customers, and relates in particular to a VPN using Multi Protocol Label Switching (MPLS) adapted to provide a precise measurement of the traffic flowing between single rate zones.

BACKGROUND

Today, there are service providers providing services in networks implemented as Virtual Private Networks (VPN) which are using links and routers of the existing networks. Such a VPN provides the appearance of a network dedicated to each customer of a service provider. In terms of security, each VPN is totally isolated from other. VPNs are of a particular importance to service providers insofar as these VPNS can be created within a single physical network to provide services to multiple customers in a transparent way.

Traditional Layer 2 VPNs are based on Layer 2 overlays over a shared network. Customer sites are interconnected via Layer 2 Virtual Circuits (Frame Relay or ATM Virtual Circuits). For any two customer devices to communicate, the Service Provider must establish one or several Layer 2 Virtual Circuits between these two customer devices.

Other VPNs are based on the MPLS (Multi Protocol Label Switching) protocol which is an IP technology defining the notions of PE (Provider Edge) devices, P (Provider) devices and CE (Customer Edge) devices. In a network using MPLS, a CE automatically has access to all CEs connected to the same PE or to any other CE attached to a PE device within the same network. The CEs are usually located on a customer premise and provide access to the shared network. MPLS technology allows the physical network to provide several VPNs to a plurality of companies sharing the physical infrastructure made up by the set of PE and P devices.

MPLS defines the use of Label Swapping technology within the network. For each customer flow, the PE devices associate a physical path across the network. This physical path is defined as a set of labels that are swapped by the P devices, along the path between the source to the destination of the packet.

For all types of Virtual Private Networks (VPN), it is mandatory to provide a precise measurement of the customer traffic transported by the shared physical network infrastructure. This measurement capability allows Service Providers to offer usage based billing in order to charge VPN customers based on the network resources they effectively use. Each packet transiting across the network must be paid for according to the real "route" followed by the packet. This determines the resources consumed by the packet across the shared physical network infrastructure. Global Service Providers face the complexity of fairly reflecting to their customers the diversity of the costs associated to their worldwide infrastructure based on what these customers effectively use.

Within an MPLS environment, such a measurement of the customers traffic flows is a challenge for Service Providers as MPLS brings an any-to-any capability to Virtual Private Networks when contrasted to traditional VPNs based on Layer 2 mechanisms. For example, by attaching a CE device to a PE, this CE device immediately obtains access to all other CE devices belonging to the same VPN that are attached to the same PE or to any other PE within the network. Although the any-to-any capability brings additional flexibility and scalability to MPLS based VPNs, country specificities as well as the variety of communication media being used make the problem much more complex in MPLS based VPNs (as contrasted with traditional VPNs) inasmuch as measurements based upon virtual circuits used in layer 2 mechanisms are not available.

Within each PE device, a dedicated routing table per VPN is used as soon as a CE belonging to this VPN is attaching to the PE. As P devices never attach a CE device, they do not contain any Routing Table associated to a VPN. In fact, P devices are not concerned with VPNs, they only behave as Label Swapping devices. The VPN dedicated routing table within a PE device is called a VRF (Virtual Routing and Forwarding instance). VRFs ensure that only those customer sites (with CE devices) that belong to the same VPN can communicate.

In a global service provider environment, the vast majority of customers served via Virtual Private Networks are not themselves truly global customers. Frequently, these customers have a large presence within one (or several) countries, with some presence dispersed in the rest of the world. As an example, a French company has in general a very large coverage (Customer Edge—CE devices) in France, a significant coverage in other countries in Europe, but a much less significant coverage outside of Europe. Charging such customers with a flat rate model is certainly not appropriate. Further, customer patterns are very likely to change across time, and Service Providers that cannot charge a customer on a per-usage basis are facing the risk of either being not competitive (not selected by potential customers), or not capable of controlling their costs (under charging or over charging their customers).

Traditionally, for MPLS based VPNs, the measurement problem is solved by routing the customer traffic to hub devices before getting out of a billing zone. The hub can be a customer owned router (functioning as a CE device), or is optionally provided by the Service Provider. This Hub provides a "bridge" between different billing zones. By measuring, for example at a layer 2 (or layer 1) level, on a per MPLS VPN basis, the traffic flowing across these Hubs, the amount of the customer traffic flowing between zones for each VPN can easily be determined and billing performed accordingly. While this solution does work, the costs associated to the Hub equipment may be prohibitive in a large service provider environment. Such a solution in fact requires dedicated equipment (a Router for example) for each VPN since for security reasons, the VPNs must be totally isolated in terms of devices routing tables. Because a CE device is an IP router (not MPLS enabled by definition), the connections between a PE and a CE has to be dedicated to a single VPN customer. Because traffic flowing between billing zones is potentially high, the links used by such connections are high speed links and require high performance PE and CE devices. Further, as a single PE to CE connection is defined over these links, the benefits of statistical multiplexing multiple connections ride over a link cannot be achieved.

Another set of solutions that can be used to solve the problems addressed in this application are solutions based on products such as Cisco's NetFlow or Cisco's BGP Policy Accounting. Solutions of this type are provided via software extensions within network devices (Routers in the MPLS case). These extensions measure the traffic flowing across a router and maintain the measurement data.

One or several Collecting devices (network appliances such as a Workstation) in the network asynchronously collect and aggregate this measurement information maintained by the network routers. Then, the aggregated information is analyzed off-line by a Service Provider's billing application.

Unfortunately, solutions based on these concepts are very resource intensive in terms of both processing resources (within the routers but also within the Collecting Devices) and in terms of traffic overhead because measured information must be gathered from the Collecting Devices from the network Routers. Further, such solutions are proprietary and not standardized and thus are not available on all types of platforms used for an MPLS network.

SUMMARY OF THE INVENTION

Accordingly, the main object of the invention is to provide a Virtual Private Network based upon MPLS having a simplified mechanism for the measurement of customer traffic flowing between billing zones and preserving the any-to-any capability of MPLS without any overlaying based on virtual circuits.

Therefore, the invention relates to a Virtual Private Network (VPN) dedicated to a customer using a physical transmission network based upon Multi-Protocol Label Switching (MPLS) technology including a plurality of Provider (P) devices and a plurality of Provider Edge (PE) devices, the customer owning at least two specific Customer Edge (CE) devices amongst a plurality of CE devices, a specific CE device being attached to a specific PE device and enabling the customer to gain access to any other CE device within the same VPN by the intermediary of PE devices to which are attached these CE devices, the VPN comprising several billing zones being each defined by the application of a single flat rate. The VPN is characterized in that a PE device belonging to each billing zone includes a virtual router associated with each billing zone, two virtual routers being interconnected by a virtual circuit transmitting all the traffic exchanged between the two associated billing zones so that the traffic flowing between the two billing zones can be measured and therefore precisely billed to the customer. A Virtual Router is the term used here to describe a Virtual Routing and Forwarding instance (VRF) within a PE device.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
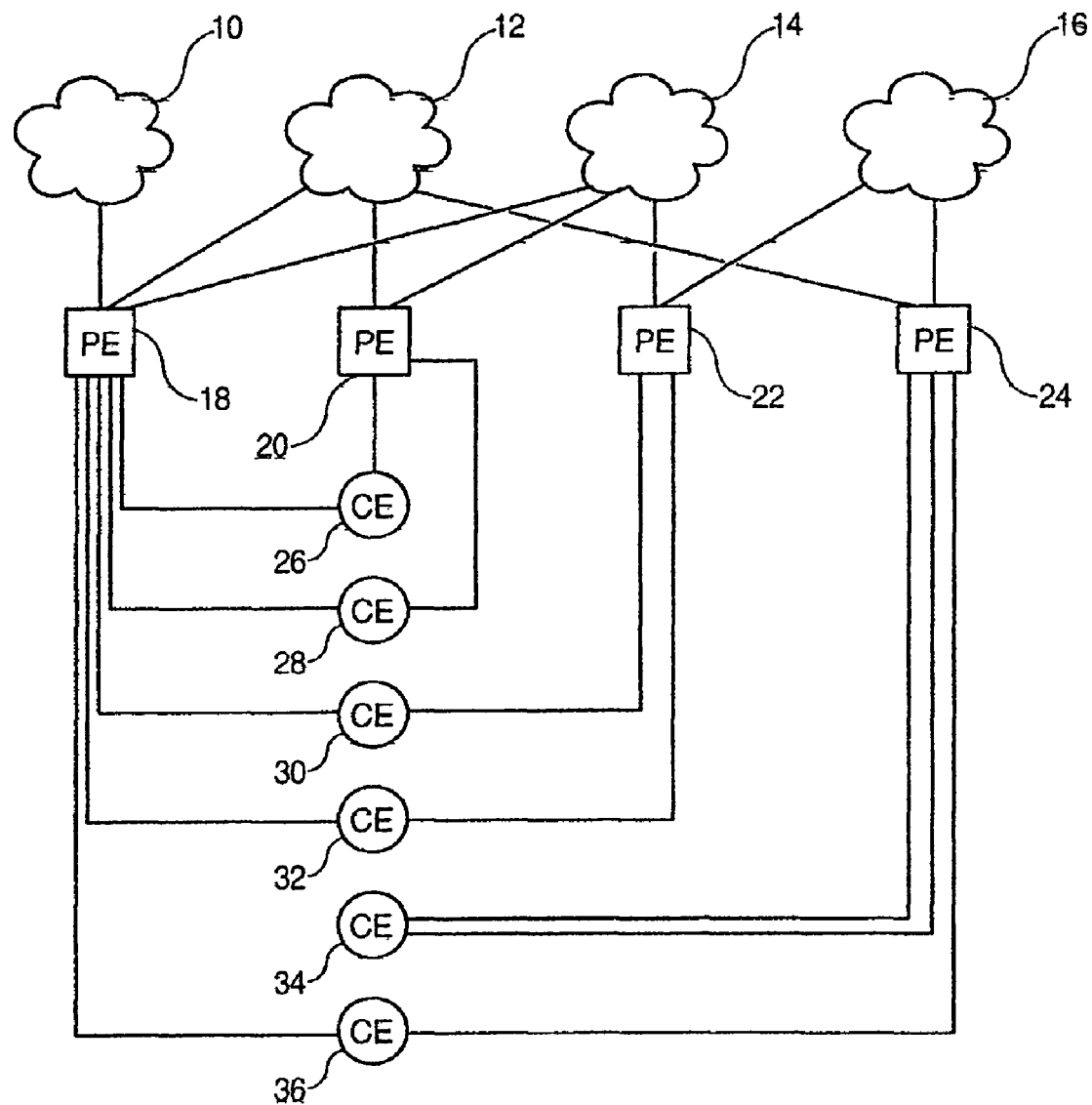
FIG. 1 is a block-diagram representing a prior data transmission system used for measuring the traffic flowing between four billing zones.

To better understand the principles of the invention, it is necessary to describe how the measurement of the traffic is achieved when several billing zones are used and when hubs operating as CE devices are used in the prior technique. Such a system is illustrated in FIG. 1 wherein the customer VPN includes four billing zones 10, 12, 14 and 16. A customer VPN spanning all four zones is implemented by the Service Provider as the union of four MPLS VPNs: MPLS VPN 10 within zone 10, MPLS VPN 12 within zone 12, MPLS VPN 14 within zone 14 and finally MPLS VPN 16 within zone 16.

In the system illustrated in FIG. 1, four PE devices 18, 20, 22 and 24 are shown, As shown, six CE devices 26, 28, 30, 32, 34 and 36 are necessary to fully interconnect the four zones. It must be noted, that with N zones, a total of N.(N−1)/2 CE devices would be required for a VPN spanning the N zones. In fact, when it is possible in terms of proximity and performance capability of the router used as a CE device, that the same router can be used to interconnect several zones but then, the links to the PE have to carry several Virtual Circuits to be able to measure on a per zone basis. Of course, the same router can only be used for the same customer VPN since a CE device cannot be shared by multiple customer VPNs.

A CE device can be attached to a single PE device such as CE device 34 which is attached only to PE device 24 for interconnecting zone 12 and zone 16, or can be attached to two different PE devices depending on how the PE devices provide connectivity to the zones that need to be interconnected. Thus, CE device 26 interconnecting zone 10 and zone 12 is attached to PE devices 18 and 20. CE device 28 interconnecting zone 10 and zone 14 is attached to PE devices 18 and 20. CE device 30 interconnecting zone 10 and zone 16 is attached to PE devices 18 and 22. CE device 32 interconnecting zone 12 and zone 14 is attached to PE devices 18 and 22. At last, CE device 36 interconnecting zones 14 and zone 16 is attached to PE devices 18 and 24. Of course other arrangements would be possible insofar as multiple alternate connections exist.

Figure 2:
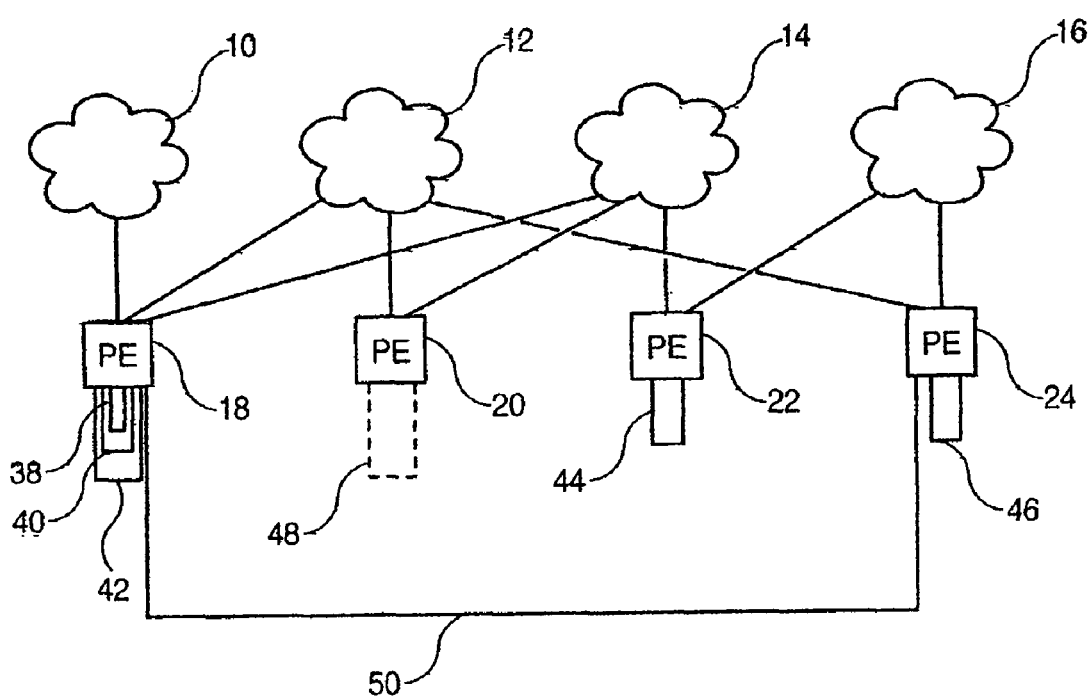
FIG. 2 is a block-diagram representing a data transmission system according to the invention used for measuring the traffic flowing between the same billing zones as in FIG. 1.

According to the invention, it is not necessary to provide specific CE devices or hubs to achieve the measurement as illustrated in FIG. 2 which represents the same number of zones 10, 12, 14 and 16 and the same PE devices 18, 20, 22 and 24 interconnecting the four zones. It must be noted that when a PE device connects to a zone, it is considered as being included in this zone. As being done for the prior system illustrated in FIG. 1, a customer VPN spanning all four zones is implemented by the Service Provider as the union of four MPLS VPNs.

As explained hereafter, a PE device associated with n zones (i.e. being included in these n zones) comprises a virtual circuit associated with each zone-to-zone interconnection, such a connection being used to transmit the whole traffic flowing between the two zones. Thus, PE device 18 which is connected to zone 10, zone 12, and zone 14, comprises a virtual circuit 38 for interconnecting zone 10 and zone 12, a virtual circuit 40 for interconnecting zone 10 and 14, and a virtual circuit 42 for interconnecting zone 12 and zone 14. Note that, if the PE device was connected to n zones, a number of n(n−1)/2 virtual circuits would be required. In the same way PE device 22 comprises a virtual circuit 44 for interconnecting zone 14 and zone 16, PE device 24 comprises a virtual circuit 46 for interconnecting zone 12 and zone 16 and PE device 20 comprises a virtual circuit 48 for interconnecting zone 12 and zone 14. In fact, the virtual circuit 48 has been represented by a dotted line because there is already such a virtual circuit 42 in PE device 18. However, the virtual circuit 48 could be necessary if the traffic between zone 12 and zone 14 over virtual circuit 42 becomes too important. Note that, since there is no PE device connected to both zone 10 and zone 16, it is necessary to provide a layer 1 or layer 2 connection 50 between PE device 18 and PE device 24.

Figure 3:
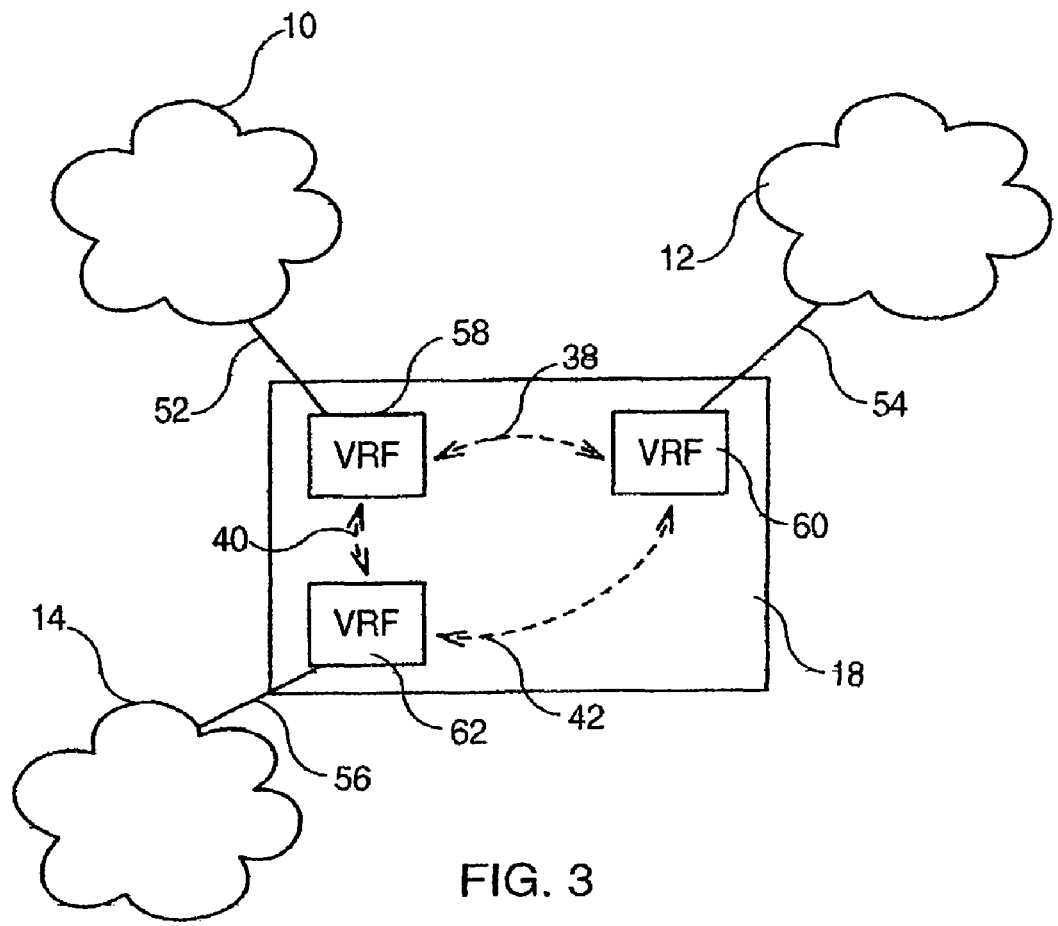
FIG. 3 is a schematic diagram illustrating a specific PE device used to measure the traffic flowing between three billing zones represented in FIG. 1.

Now, the way to achieve the invention in a PE device is explained in reference to FIG. 3 representing the PE device 18 which is common for zones 10, 12 and 14 as illustrated in FIG. 2. This means that PE device 18 is attached to zone 10 by a link 52, attached to zone 12 by a link 54 and attached to zone 14 by a link 56. As already mentioned, PE device 18 is used for measuring the traffic flowing between zone 10 and zone 12, the traffic flowing between zone 12 and zone 14 and the traffic flowing between zone 10 and zone 14.

As PE device 18 is associated with three zones, a virtual router is associated with each zone: virtual router 58 is associated with zone 10, virtual router 60 is associated with zone 12, virtual router 62 is associated with zone 14. Note that such virtual routers can be essentially constituted by the routing tables called Virtual Routing and Forwarding instance (VRF) which already exist in the PE device and ensure that only those customer sites that belong to the same VPN can communicate between them.

The virtual routers of the PE device 18 are connected to each other by virtual circuits over which are exchanged the data flowing between the two associated zones. Thus, virtual circuit 38 is used for transporting the traffic between zone 10 and zone 12, virtual circuit 42 is used for transporting the traffic between zone 12 and zone 14, and virtual circuit 40 is used for transporting the traffic between zone 10 and zone 14. For transmitting the data between two virtual routers, a routing protocol between the two Virtual Routers is required. This means that each virtual router injects via the standard routing protocol messages routing updates for subnet addresses to the destination virtual router. The routing update flows occur during the whole life of the connection between the VRFs of interconnected zones.

To enable traffic flowing between billing zones, a routing protocol (such as eBGP—exterior Border Gateway Protocol, or OSPF—Open Short Path First, or RIP Routing Information Protocol) must be enabled over each virtual circuit between VRFs as already mentioned. Via these routing protocols, a VRF (A) on one side sends routing updates to the VRF on the other side (B) to describe the IP subnets that can be accessed via VRF (A). Similarly, VRF (B) sends routing updates to VRF (A) to describe the IP subnets that can be accessed via VRF (B). For the smaller VPNs, a routing protocol is not mandatory and manual configurations can be performed within the VPN's VRF to describe static IP routes to avoid dynamic routing protocols as described above.

Figure 4:
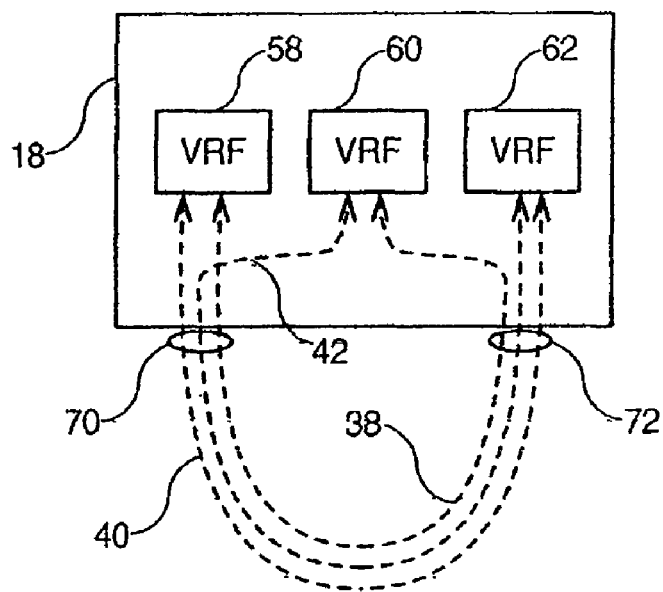
FIG. 4 is a schematic diagram illustrating how the virtual routers of the specific PE device represented in FIG. 3 are interconnected.

In reference to FIG. 4, the virtual routers, VRFs in this embodiment, are connected by means of virtual circuits as already mentioned. In the present case, it is judicious to only have two physical interfaces 70 and 72 such as LAN interfaces or Packet Over Sonet (POS) interfaces directly connected to each other via a single local cable, the virtual circuits being multiplexed over the cable. Outside the PE device 18, the cable includes the three virtual circuits 38, 40 and 42. The very same protocols that were used in case of a real hub device are preserved over these back to back physical interfaces. It must be noted that a telecommunication line with virtual circuit capabilities using a Frame Relay protocol for example could be used instead of a simple local cable.

As far as the billing is concerned, normal measurement mechanisms are used, based on the PEs layer 2 capabilities. For example, if a Frame Relay virtual circuit is used, Frame Relay measurement mechanisms over a Virtual Circuit are used unchanged, all traffic flowing in each direction over the Virtual Circuit can be accounted for.

For a Frame Relay connection, up to a thousand virtual circuits are available and thus up to a thousand VPN interconnections may be supported over a looped interface. If more VPN interconnections are required, multiple pairs of interfaces may be used. Of course, when reliability is required, several PE devices can be used between any two zones, taking advantage of the routing protocol capabilities namely the recovery in case of link or router failures.

In FIG. 4, from VRF 58 standpoint, VRF 60 appears as a directly attached CE device via the Virtual Circuit 38 between VRF 58 and VRF 60. Similarly, from VRF 60 standpoint, VRF 58 appears as a directly attached CE device via the same Virtual Circuit. The VRFs have the same type of relationships over the other Virtual Circuits. Across each of the Virtual Circuits, routing update flows occur on both directions if a dynamic routing protocol is used.

Therefore, by simply determining the measurement points (according to the definition of the billing zones) i.e., the transit PE devices between billing zones, it becomes a lot easier for the Service Providers to better reflect their infrastructure costs, when dynamic flows of communication are measured. As an example, a Service Provider may decide to impose a flat rate within and across several countries (France, UK, Italy and Germany for example), while still imposing a significantly higher rate to other countries (such as the Nordic countries within Europe). Another tariff may also be used for the part of the customer traffic that goes outside of Europe (to Canada, Latin America or North America for example). This provides maximum flexibility to the Service Providers.

The invention claimed is:

1. A network device comprising:
   a first virtual router of the device associated with a first billing zone, the first billing zone being associated with a first provider;
   a second virtual router of the device associated with a second billing zone, the second billing zone being associated with a second provider;
   a first virtual circuit between the first virtual router and the second virtual router interconnecting the first billing zone and the second billing zone such that traffic exchanged between the first billing zone and the second billing zone can be measured and billed to a customer;
   a third virtual router of the device associated with a third billing zone; and
   a second virtual circuit between the third virtual router and one of the first and second virtual routers interconnecting the third billing zone and the respective one of the first and second billing zones such that traffic exchanged between the third billing zone and the respective one of the first and second billing zone can be measured and billed to a customer.

2. The network device of claim 1, further comprising:
   a first physical interface; and
   a second physical interface,
   wherein the first and second virtual circuits are multiplexed over a single cable from the first physical interface to the second physical interface of the device.

3. The network device of claim 2, wherein the first and second virtual circuits are multiplexed over a telecommunication line over a frame relay protocol.

4. The network device of claim 1, wherein the first virtual router and the second virtual router each comprise Virtual Routing and Forwarding (VRF) instances.

5. A network device comprising:
a first virtual router of the device associated with a first billing zone, the first billing zone being associated with a first provider;
a second virtual router of the device associated with a second billing zone, the second billing zone being associated with a second provider;
a first virtual circuit between the first virtual router and the second virtual router interconnecting the first billing zone and the second billing zone such that traffic exchanged between the first billing zone and the second billing zone can be measured and billed to a customer; and
a second virtual circuit between one of the first and second virtual routers and a virtual router of a second network device, the virtual router of the second network device being associated with a third billing zone, such that traffic exchanged between the third billing zone and the respective one of the first and second billing zone can be measured and billed to a customer.

6. The network device of claim 5, wherein the one of the first and second virtual routers comprises a first Virtual Routing and Forwarding instance (VRF) and the virtual router of the second network device comprises a second VRF, and a routing protocol is enabled over the second virtual circuit by sending routing updates from the first VRF to the second VRF.

7. The network device of claim 1, wherein the first and second billing zones are each defined by the application of a single flat rate.

8. A method of measuring network traffic between pairs of a plurality of zones, the method comprising:
receiving a first data at a first virtual router of a network device, the first virtual router associated with a first billing zone associated with a first provider;
transmitting the first data to a second virtual router of the network device via a first virtual circuit, the second virtual router associated with a second billing zone associated with a second provider, and the first virtual circuit between the first virtual router and the second virtual router interconnecting the first billing zone and the second billing zone;
measuring the first data exchanged between the first billing zone and the second billing zone;
receiving a second data at a third virtual router of the network device, the third virtual router associated with a third billing zone;
transmitting the second data to a one of the first and second virtual routers of the network device via a second virtual circuit interconnecting the third billing zone and the respective one of the first and second billing zone; and
measuring the second data exchanged between the third billing zone and the respective one of the first and second billing zone.

9. The method of claim 8, further comprising multiplexing the first data and the second data over a single cable from a first physical interface of the device to a second physical interface of the device.

10. The method of claim 9, wherein the multiplexing is performed over a telecommunication line using a frame relay protocol.

11. The method of claim 8, wherein the first virtual router and the second virtual router each comprise Virtual Routing and Forwarding (VRF) instances.

12. A method of measuring network traffic between pairs of a plurality of zones, the method comprising:
receiving a first data at a first virtual router of a network device, the first virtual router associated with a first billing zone associated with a first provider;
transmitting the first data to a second virtual router of the network device via a first virtual circuit, the second virtual router associated with a second billing zone associated with a second provider, and the first virtual circuit between the first virtual router and the second virtual router interconnecting the first billing zone and the second billing zone;
measuring the first data exchanged between the first billing zone and the second billing zone;
receiving a second data at one of the first and second virtual routers;
transmitting the second data to a third virtual router of a second network device via a second virtual circuit, the third virtual router associated with a third billing zone and the second virtual circuit interconnecting the third billing zone and the respective one of the first and second billing zone; and
measuring the second data exchanged between the third billing zone and the respective one of the first and second billing zone.

13. The method of claim 8, further comprising sending routing updates from the first virtual router to the second virtual router so as to enable a routing protocol.

14. The method of claim 8, wherein the first and second billing zones are each defined by the application of a single flat rate.

* * * * *